(12) United States Patent
Lu

(10) Patent No.: US 8,196,765 B2
(45) Date of Patent: Jun. 12, 2012

(54) MULTI-FUNCTION CARRIER

(76) Inventor: I-Shyong Lu, Taichung (TW)

( * ) Notice: Subject to any disclaimer, the term of this patent is extended or adjusted under 35 U.S.C. 154(b) by 202 days.

(21) Appl. No.: 12/812,738

(22) PCT Filed: Feb. 1, 2008

(86) PCT No.: PCT/CN2008/000264
§ 371 (c)(1),
(2), (4) Date: Jul. 13, 2010

(87) PCT Pub. No.: WO2009/100570
PCT Pub. Date: Aug. 20, 2009

(65) Prior Publication Data
US 2010/0294756 A1 Nov. 25, 2010

(51) Int. Cl.
*B65D 6/00* (2006.01)
*B65D 8/14* (2006.01)

(52) U.S. Cl. .......................................... 220/6; 220/4.28

(58) Field of Classification Search ................ 220/4.28, 220/4.32, 6
See application file for complete search history.

(56) References Cited

U.S. PATENT DOCUMENTS

| | | | | |
|---|---|---|---|---|
| 2,503,811 | A * | 4/1950 | Emigholz et al. | 220/4.28 |
| 3,799,384 | A * | 3/1974 | Hurkamp | 220/6 |
| 8,061,571 | B2 * | 11/2011 | Aghajanian | 224/499 |
| 2008/0224441 | A1 * | 9/2008 | Lu | 280/278 |

FOREIGN PATENT DOCUMENTS

WO    WO 2008028380 A1 *   3/2008

OTHER PUBLICATIONS

Notification Concerning Availability of the Publication of the International Application dated Aug. 20, 2009 for the International Application No. PCT/CN2008000264.
Chinese International Search Report dated Nov. 13, 2008 for International Application No. PCT/CN2008/000264.
Chinese Preliminary Examination Report dated Feb. 1, 2008 for International Application No. PCT/CN2008/000264.

* cited by examiner

*Primary Examiner* — Harry Grosso
(74) *Attorney, Agent, or Firm* — WPAT, P.C.; Anthony King

(57) ABSTRACT

A multi-function carrier includes a bottom plate bilaterally connected to pivotable lateral plates, wherein each of the lateral plates may be a one-piece grid or a two-piece folding grid, a pivotable rear plate, and a pivotable front plate. The front plate has sliding blocks for being slidably mounted on horizontal sliding guides of the bottom plate. The two lateral plates, the front plate and the rear plate, when posed vertically, are mutually coupled and jointly form a top-opened basket-like structure together with the bottom plate. When the two lateral plates and the front plate are laid over the bottom plate, the multi-function carrier provides a rack-like structure. The multi-function carrier further has an extendable gripper which is movably attached to the front plate and has a movable pressing member.

10 Claims, 6 Drawing Sheets

MULTI-FUNCTION CARRIER

BACKGROUND OF THE INVENTION

1. Technical Field

The present invention relates to carriers configured to be counted on bicycles, electric bicycles, electric scooters, motorcycles, folding bicycles or folding shopping carts for carrying articles. More particularly, the present invention relates to a multi-function carrier which, when expanded, provides a basket-like structure with an internally arranged extendable gripper for holding articles carried by the carrier, and when folded, provides a rack-like structure working with the extendable gripper as an extendable rack. The disclosed multi-function carrier can be further folded for easy storage. There are sliding components in the multi-function carrier for smooth operation of expanding and folding the carrier.

2. Description of Related Art

It is common that a bicycle is installed ahead a basket and aback a rack for receiving articles to be transported by the bicycle. Conventionally, such a basket is an inflexible structure composed of some meshed plates soldered together while such a rack provides an inflexible plane formed by plural steel sticks coming with a spring-loaded gripper for fixing the carried articles. While being long popular with people, each of the foregoing carrying tools has its advantages and disadvantages. Hence, it would be beneficial to provide a single carrier having the advantages and avoiding the disadvantages of the both prior-art devices.

SUMMARY OF THE INVENTION

In view of the desire for the improvement, the present invention herein incorporates multiple carrying functions in one transformable multi-function carrier. In brief, the multi-function carrier when folded is a rack-like structure and when expanded is a basket-like structure.

The multi-function carrier comprises a bottom plate bilaterally connected to pivotable lateral plates, wherein each of the lateral plates may be a one-piece grid or a two-piece folding grid, a pivotable rear plate, and a pivotable front plate. The front plate has sliding blocks for being slidably mounted on horizontal sliding guides of the bottom plate. The two lateral plates, the front plate and the rear plate, when posed vertically, are mutually coupled and jointly form a top-opened basket-like structure together with the bottom plate. When the two lateral plates and the front plate are laid over the bottom plate, the multi-function carrier provides a rack-like structure. The multi-function carrier further has an extendable gripper which is movably attached to the front plate and has a movable pressing member.

One objective of the present invention is to provide the above-described multi-function carrier, wherein the horizontal sliding guides and the sliding blocks ensure stable sliding motion of the front plate.

Another objective of the present invention is to provide the above-described multi-function carrier, which is transformable between the basket-like structure and the rack-like structure.

Another objective of the present invention is to provide the above-described multi-function carrier, wherein when the multi-function carrier is of the basket-like structure, the extendable gripper serves to hold external articles carried in the basket-like structure, so that the external articles are secured from being tossed as bike jolts. Since the extendable gripper is shiftable, even when the external articles to be carried exceed the basket-like structure in height, the extendable gripper can also hold the articles firmly, which is an unanticipated effect in view of the existing carrier products.

Another objective of the present invention is to provide the above-described multi-function carrier, wherein by extending the extendable gripper, extra carrying area of the multi-function carrier can be provided to meet more practical needs.

Another objective of the present invention is to provide the above-described multi-function carrier, wherein when the lateral plates are two-piece folding grids, by turning upper parts of the lateral plates outward, extra carrying width of the multi-function carrier can be provided to meet more practical needs.

BRIEF DESCRIPTION OF THE DRAWINGS

The invention as well as a preferred mode of use, further objectives and advantages thereof will be best understood by reference to the following detailed description of an illustrative embodiment when read in conjunction with the accompanying drawings, wherein.

DETAILED DESCRIPTION OF THE INVENTION

Figure 1:
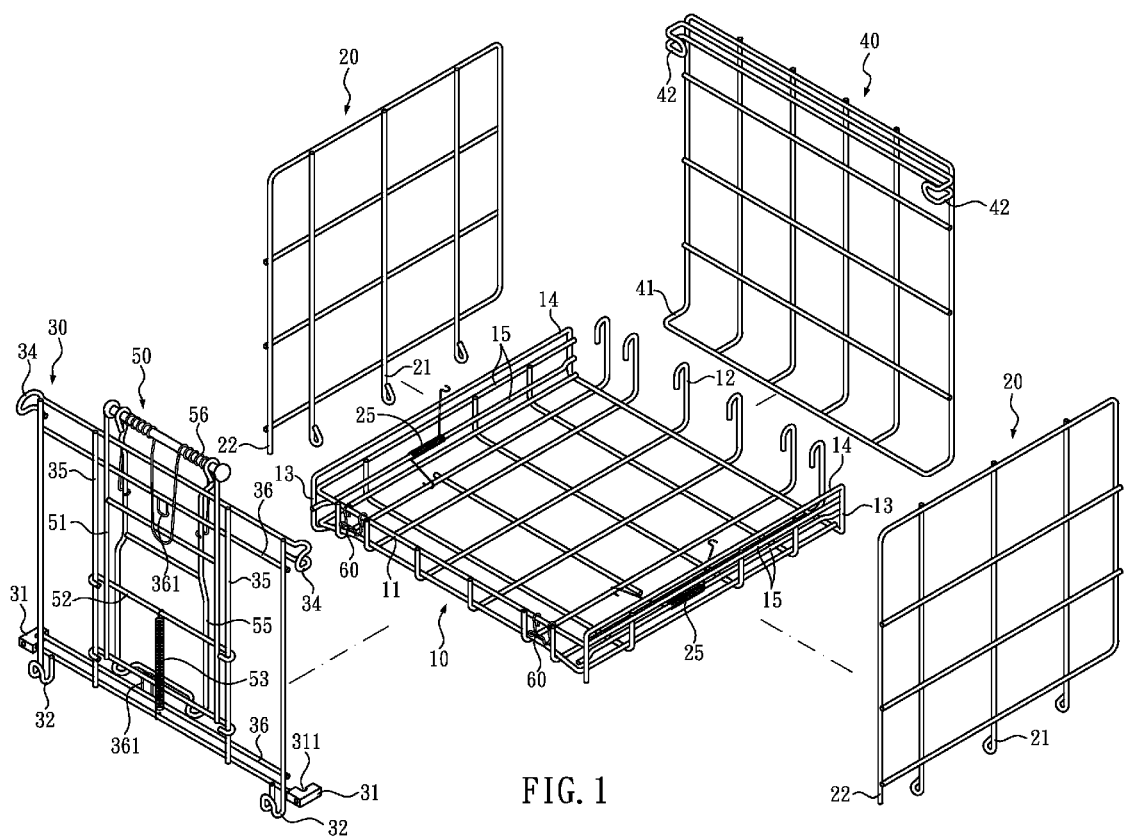
FIG. 1 is an exploded view of a multi-function carrier according to the present invention.
Figure 2:
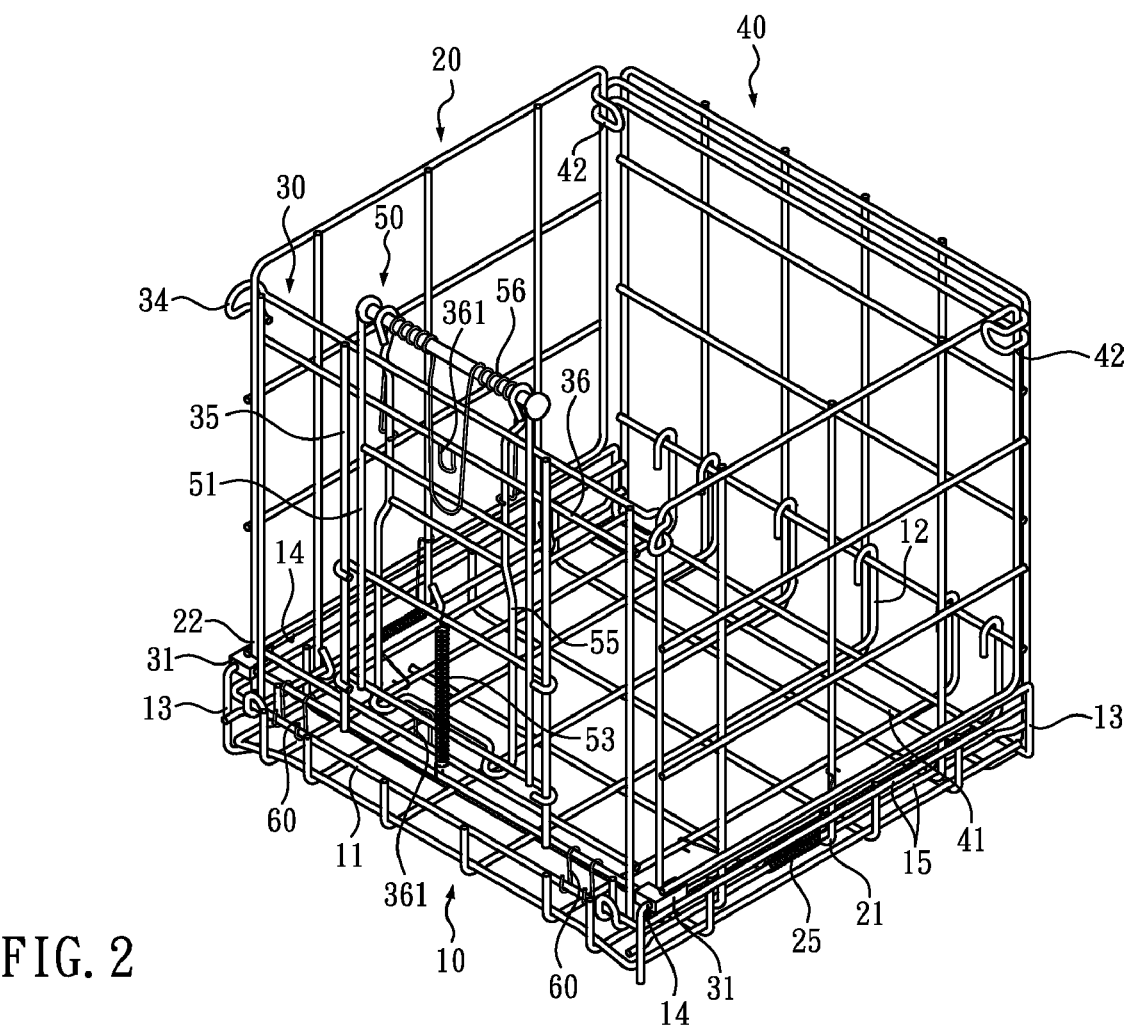
FIG. 2 is a perspective view of the multi-function carrier set into a basket-like structure.

Referring to FIGS. 1 and 2, according to the present invention, a multi-function carrier is primarily composed of a bottom plate 10, two lateral plates 20, a front plate 30, a rear plate 40 and an extendable gripper 50.

The bottom plate 10 is peripherally formed with upward extended one front revetment 11, one rear revetment 12 and two opposite lateral revetments 13. Each of the lateral revetments 13 is atop provided with a horizontal sliding guide 14.

The two lateral plates 20 each has at least one vertically extended connecting sticks 21 to thereby pivotally connect to a horizontal stick 15 of the corresponding lateral revetment 13 and each has at least one vertically extended border stick 22. The lateral plates 20 may be posed perpendicular to or laid down on the bottom plate 10. Each of the lateral plates 20 may be a one-piece grid or a two-piece folding grid.

There are two torsion springs 25 each of which is mounted around the horizontal stick 15 of one said bottom plate 10 with its two spring ends coupled with sticks of the lateral plate 20 and the bottom plate 10, respectively. The two torsion springs 25 are configured to bias the two lateral plates 20 to be normally perpendicular to the bottom plate 10.

Two sliding blocks 31 are provided at and allowed to pivot with respect to the two ends of a lower edge of the front plate 30. Each of the two sliding blocks 31 is for coupling one corresponding said horizontal sliding guide 14. The sliding blocks 31 each has a notch 311 at a surface where they face each other. Two lower-front retaining hooks 32 are extended from the lower edge of the front plate 30 for coupling the front revetment 11. The front plate 30 is also configured to be posed perpendicular to or laid horizontally next to the bottom plate 10. Particularly, the front plate 30 laid horizontally can be slid with the sliding blocks 31 along the horizontal sliding guide 14 to stay atop the bottom plate 10. The front plate 30 has an upper edge formed with two outward extended upper-front retaining hooks 34. When the front plate 30 and the lateral plates 20 are set vertically, namely perpendicular to the bottom plate 10, the notches 311 receive the adjacent border sticks 22 of the two lateral plates 20, while the upper-front retaining hooks 34 retain upper ends of the adjacent border sticks 22 of the two lateral plate 20 so that the two lateral plates 20 are stably positioned by the front plate 30.

The rear plate 40 has a lower end pivotally connected to the rear revetment 12 of the bottom plate 10. A retaining flange 41 is inward extended from the lower edge of the rear plate 40 so that when the L-shaped rear plate 40 is posed vertically, the retaining flange 41 abuts against a lower surface of the bottom plate 10 so as to make the rear plate 40 perpendicular to the bottom plate 10. Two rear retaining hooks 42 are formed at two ends of an upper end of the rear plate 40 so that when the lateral plates 20 are posed vertically, the rear retaining hooks 42 hold upper ends of the adjacent border sticks 22 of the two lateral plates 20 to retain the lateral plates 20 from turning outward with respect to the bottom plate 10, thereby cooperating with the upper-front retaining hooks 34 of the front plate 30 to firmly position the two lateral plates 20.

The extendable gripper 50 is attached to the front plate 30, and composed of a body 51 at an outer surface of the front plate 30 as well as a movable pressing member 55 moveably connected atop the body 51 from an inner surface of the front plate 30. The body 51 includes at least one sliding bar 52 spanning vertical sliding guides 35 of the front plate 30. In addition, a spring 53 is arranged between the sliding bar 52 and the front plate 30 while a torsion spring 56 is connected between the body 51 and the movable pressing member 55, so as to enable the movable pressing member 55 to apply a pressing force to the body 51 for gripping anything therebetween. The extendable gripper 50 can be lift along the vertical sliding guides 35. Horizontal retaining bars 36 are provided near the upper and lower edges of the front plate 30. The upper retaining bar 36 provides an upper limit to the upward lift extendable gripper 50 by blocking the sliding bar 52 on its way upward and the sliding bar 52 is coupled to the lower horizontal retaining bar 36 via the spring 53. Moreover, the retaining bars 36 each has a positioning hook 361 for holding the sliding bar 52 so as to hold the extendable gripper 50 in position. The spring 53 gives the body 51 a returning force. In the depicted embodiment of the present invention, the sliding bar 52 of the body 51 is attached to the vertical sliding guides 35 by two hooked ends. However, coupling between the vertical sliding guides 35 and the sliding bar 52 is not limited thereto. In other embodiments, the sliding bar 52 and the vertical sliding guides 35 may be coupled by means of sliding blocks and horizontal sliding guides, as long as the extendable gripper 50 is movable and positionable with respect to the front plate 30.

At least one fastener 60 is movably attached to the front revetment 11 for latching the front plate 30 either when it is posed perpendicular to the bottom plate 10 or when it is laid over the bottom plate 10, so as to position the front plate 30 more firmly.

Figure 3:
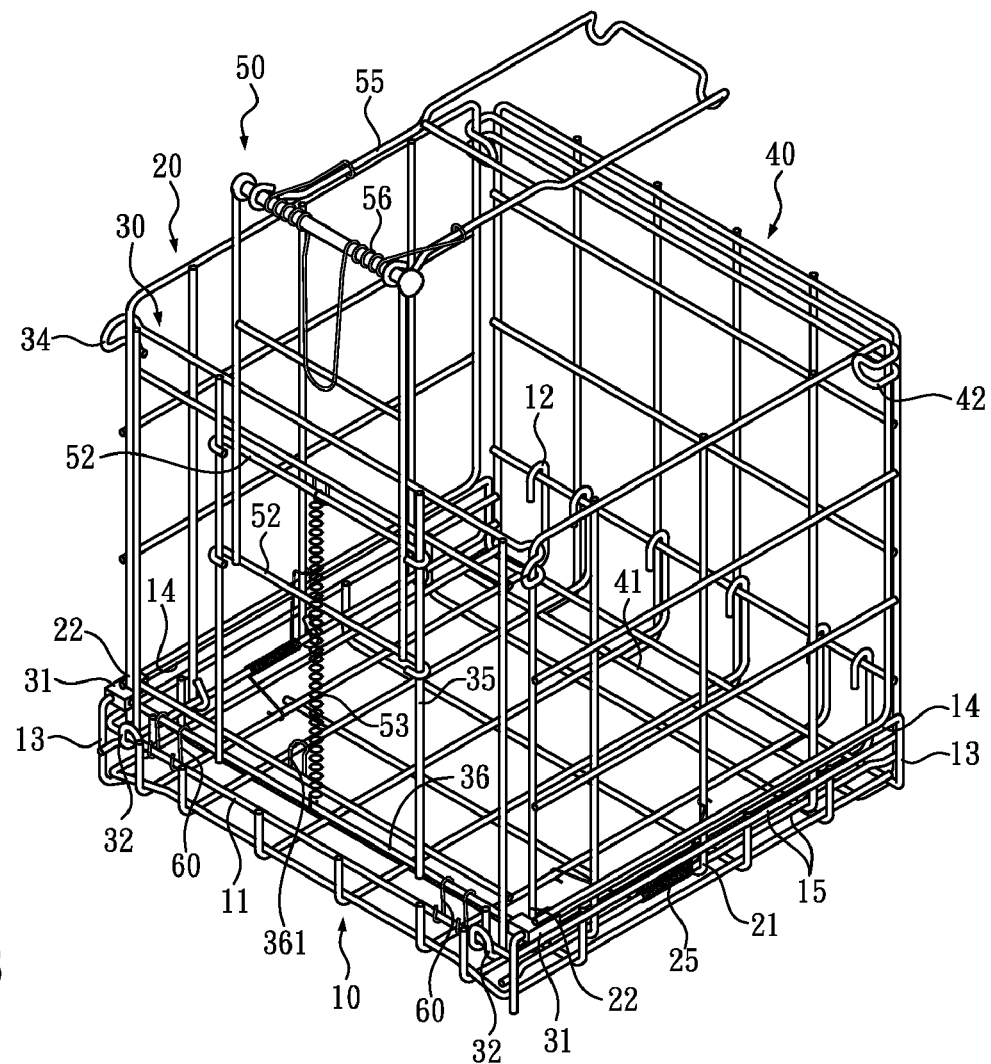
FIG. 3 shows an extendable gripper in the multi-function carrier of FIG. 2 extended.

As shown in FIG. 3, the disclosed carrier is now set into a basket-like structure for receiving external articles (not shown). The extendable gripper 50 can be lift to a desired altitude so as to have the movable pressing member 55 properly pressing and thereby positioning the external articles. The present invention features that the carrier can be transformed into a rack-like structure in addition to the foregoing basket-like structure by the operation illustrated in FIGS. 4 through 6.

Figure 4:
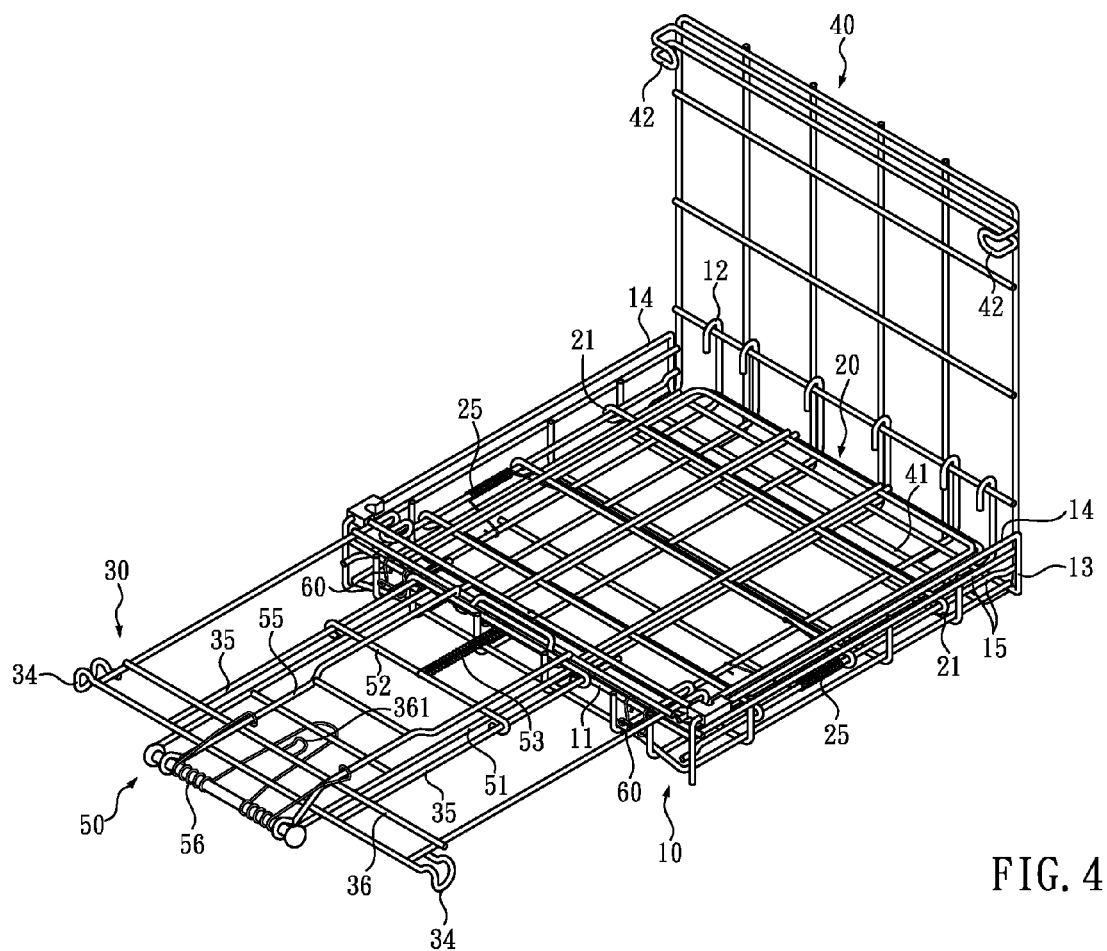
FIG. 4 through FIG. 6 illustrate the multi-function carrier folded into a rack-like structure.

In FIG. 4, the lateral plates 20 are folded inward and placed on the bottom plate 10 while the front plate 30 is laid horizontally next to the bottom plate 10.

Figure 5:
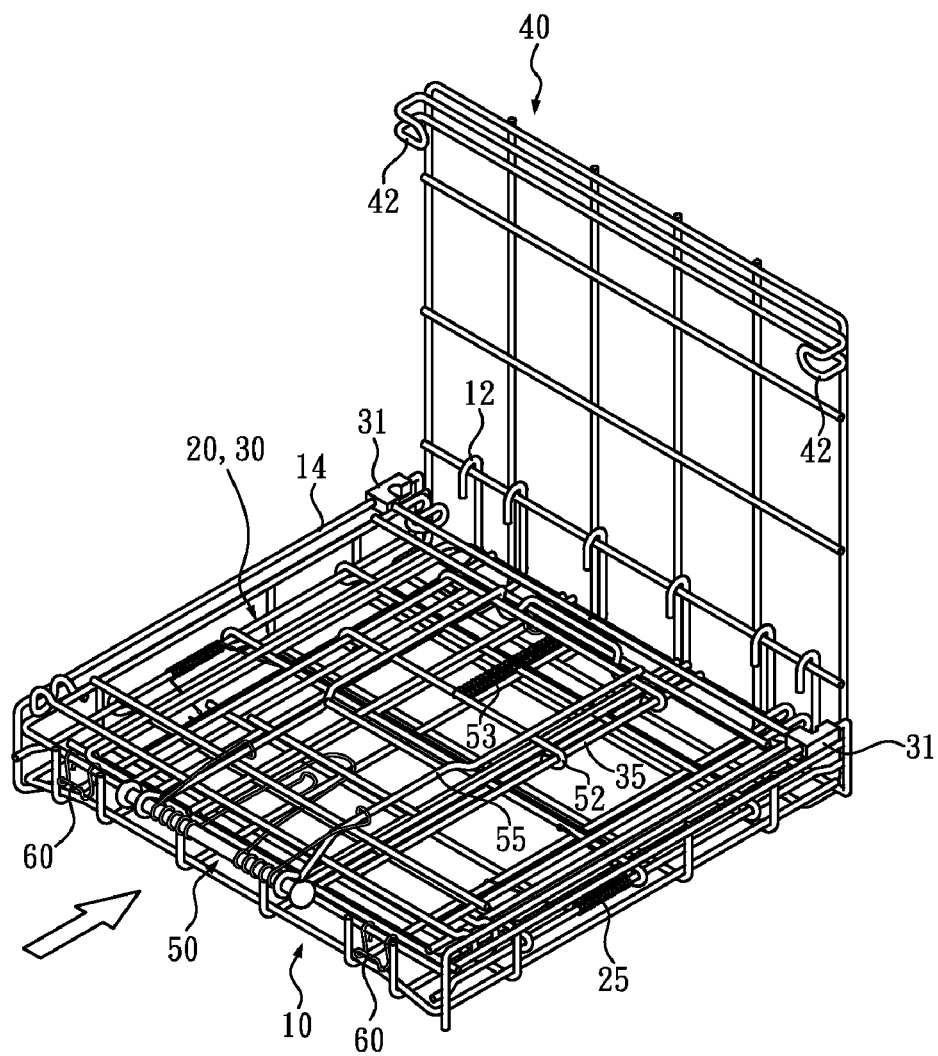
Figure 6:
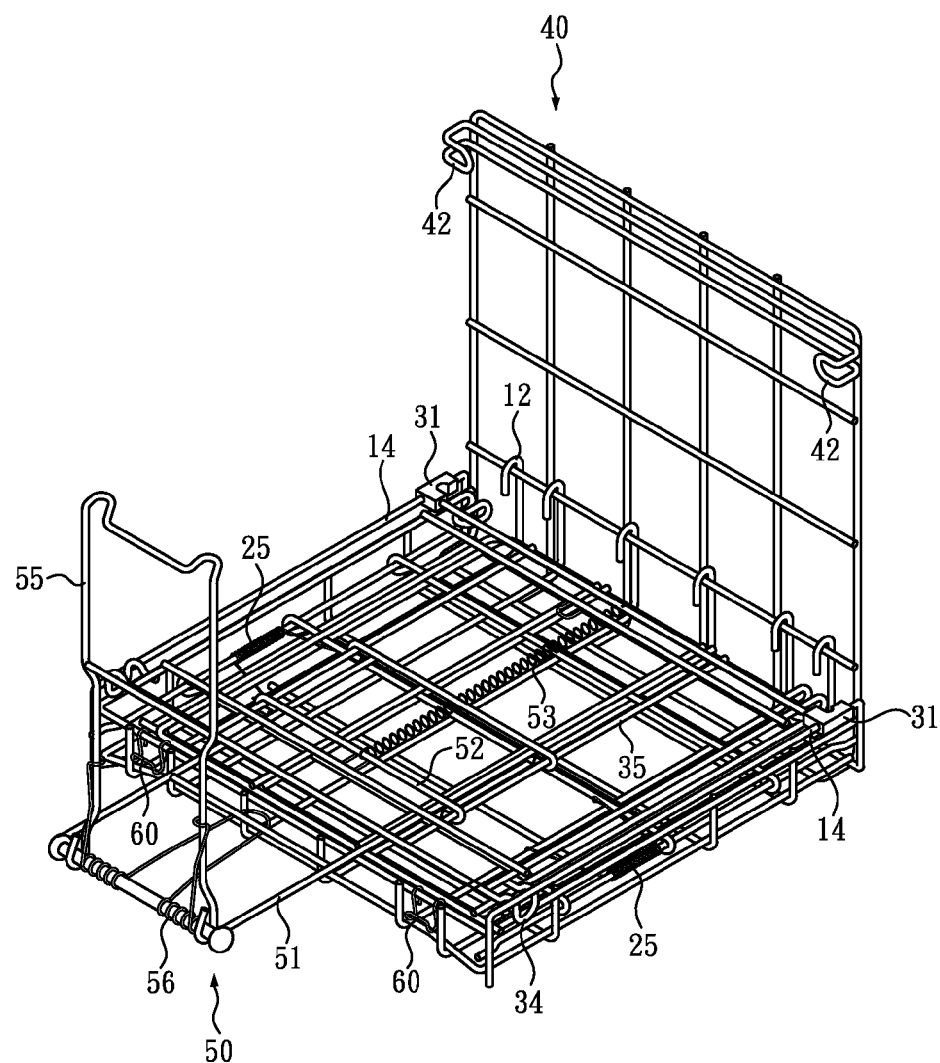

The front plate 30 is then pushed toward the bottom plate 10 in the direction indicated by the arrow in FIG. 5 so that the sliding blocks 31 slide along the horizontal sliding guides 14. In the shown embodiment, each of the sliding blocks 31 is L-shaped with a longer part mounted around the corresponding horizontal sliding guide 14, so there is sufficient contacting area between the sliding block 31 and the horizontal sliding guide 14 that ensures stable sliding motion of the front plate 30. When eventually coming to the top of the bottom plate 10 and the folded lateral plates 20, the front plate 30 is latched by the fastener 60 and thus positioned. At this time, the multi-function carrier is transformed into the rack-like structure. Referring to FIG. 6, the extendable gripper 50, when not extended, serves to position external articles (not shown) carried by the multi-function carrier with the movable pressing member 55, and when extended, provides extra carrying area to the entire rack-like structure.

When further folded by laying the rear plate 40 upon the front plate 30, the multi-function carrier is minimized in height and thus is convenient to store.

Furthermore, when each of the lateral plates 20 is in the form of a two-piece folding grid, the multi-function carrier is endowed with more flexibility in use because in the basket-like structure of the multi-function carrier, upper parts of the lateral plates 20 are eversible to provide extra carrying width to the entire basket-like structure for carrying, with the assistance of proper supporting and positioning components, larger articles.

The present invention has been described with reference to the preferred embodiments and it is understood that the embodiment is not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A multi-function carrier, comprising:
a bottom plate;
two lateral plates pivotally connected to two opposite lateral edges of the bottom plate;
a rear plate pivotally connected to a rear edge of the bottom plate; and
a front plate having two ends of a lower edge each provided with a pivotable sliding block, wherein the two sliding blocks are slidably mounted on horizontal sliding guides at the lateral edges of the bottom plate so that the front plate is allowed to be posed perpendicular to or laid horizontally next to the bottom plate, and the laid front plate is allowed to be slid, by means of the sliding blocks, to a top of the horizontal sliding guides.

2. The multi-function carrier of claim 1, wherein each of the two lateral plates has at least one vertically extended border stick, and the sliding blocks each has a notch at a surface thereof facing the other sliding block, so that when the two lateral plates and the front plate are posed vertically, the notches receive the adjacent border sticks of the two lateral plates and wherein the front plate has an upper edge formed with two outward extended upper-front retaining hooks so that when the two lateral plates and the front plate are posed vertically, the upper-front retaining hooks hook the two lateral plates.

3. The multi-function carrier of claim 1, wherein the bottom plate is formed with a front revetment extended upward and two lower-front retaining hooks are extended from the lower edge of the front plate for coupling the front revetment when the front plate is posed vertically while at least one fastener is movably connected to the front revetment for latching the front plate.

4. The multi-function carrier of claim 1, wherein the bottom plate is bilaterally formed with lateral revetments extended upward, and each of the two lateral plates has at least one vertically extended connecting stick for being movably connected to a horizontal stick of the lateral revetments, in which each of the horizontal sticks is mounted by a torsion spring that has two spring ends coupled with sticks of the lateral plate and the bottom plate, respectively.

5. The multi-function carrier of claim 1, wherein the bottom plate is formed with a rear revetment extended upward and a retaining flange is inward extended from a lower edge of the rear plate, so that when the rear plate is posed vertically, the retaining flange abuts against a lower surface of the bottom plate.

6. The multi-function carrier of claim 1, wherein two rear retaining hooks are formed at two ends of an upper end of the rear plate so that when the lateral plates are posed vertically, the rear retaining hooks hold upper ends of the adjacent border sticks of the two lateral plates to retain the lateral plates from turning outward with respect to the bottom plate.

7. The multi-function carrier of claim 1, further comprising an extendable gripper attached to the front plate wherein the extendable gripper is shiftable along the front plate and includes a movable pressing member.

8. The multi-function carrier of claim 7, wherein the extendable gripper comprises a body and the movable pressing member has one end movably connected atop the body, the body including at least one sliding bar spanning vertical sliding guides of the front plate, a spring being arranged between the sliding bar and the front plate, and a torsion spring being connected between the body and the movable pressing member.

9. The multi-function carrier of claim 8, further comprising horizontal retaining bars provided near the upper and lower edges of the front plate wherein the horizontal retaining bar near the upper edge provides an upper limit to the upward lift extendable gripper by blocking the upward shifting sliding bar and the sliding bar is connected to the horizontal retaining bar near the lower edge via the spring.

10. The multi-function carrier of claim 9, wherein each of the retaining bars has a positioning hook for holding the sliding bar so as to hold the extendable gripper in position.

* * * * *